(12) United States Patent
Farnioli

(10) Patent No.: US 12,515,327 B2
(45) Date of Patent: Jan. 6, 2026

(54) ROBOTIC DEVICE

(71) Applicant: Dyson Technology Limited, Wiltshire (GB)

(72) Inventor: Edoardo Farnioli, Bristol (GB)

(73) Assignee: Dyson Technology Limited, Malmesbury (GB)

( * ) Notice: Subject to any disclaimer, the term of this patent is extended or adjusted under 35 U.S.C. 154(b) by 171 days.

(21) Appl. No.: 17/797,014

(22) PCT Filed: Feb. 19, 2021

(86) PCT No.: PCT/GB2021/050417
§ 371 (c)(1),
(2) Date: Aug. 2, 2022

(87) PCT Pub. No.: WO2021/170978
PCT Pub. Date: Sep. 2, 2021

(65) Prior Publication Data
US 2023/0063392 A1 Mar. 2, 2023

(30) Foreign Application Priority Data

Feb. 27, 2020 (GB) .................................. 2002771

(51) Int. Cl.
*B25J 9/16* (2006.01)
(52) U.S. Cl.
CPC ........... *B25J 9/1638* (2013.01); *B25J 9/1633* (2013.01)
(58) Field of Classification Search
CPC ................. B25J 9/1638; B25J 9/1633; G05B 2219/39188; G05B 2219/39194;
(Continued)

(56) References Cited

U.S. PATENT DOCUMENTS

2013/0116827 A1* 5/2013 Inazumi ..................... B25J 9/16
700/260
2013/0184869 A1* 7/2013 Inazumi ................. B25J 9/1633
700/260
(Continued)

FOREIGN PATENT DOCUMENTS

CN 104723340 A 6/2015
CN 108621162 A 10/2018
(Continued)

OTHER PUBLICATIONS

Al-Shuka et al., "Active Impedance Control of Bioinspired Motion Robotic Manipulators: An Overview," Applied Bionics and Biomechanics, vol. 2018, Oct. 18, 2018, p. 19.
(Continued)

*Primary Examiner* — Dylan M Katz
(74) *Attorney, Agent, or Firm* — Tucker Ellis LLP

(57) ABSTRACT

Certain examples described herein provide a method of controlling a robotic device including a body, an end effector coupled to the body by one or more joints and a propulsion system to drive the one or more joints to control a state of the robotic device. Example methods include applying impedance control to the robotic device; determining a reference trajectory of the end effector; detecting an applied external force and/or torque acting on the robotic device causing a departure from the reference trajectory; calculating an adjustment to be applied to one or more of the one or more joints to compensate for the detected applied external force and/or torque; and using the calculated adjustment to control the one or more joints to actuate the end effector and recover the reference trajectory of the end effector.

19 Claims, 3 Drawing Sheets

(58) Field of Classification Search
CPC .......... G05B 2219/39343; G05B 2219/39347; G05B 2219/39355; G05B 2219/41371; G05B 2219/41381
See application file for complete search history.

(56) References Cited

U.S. PATENT DOCUMENTS

| | | | | |
|---|---|---|---|---|
| 2014/0081461 | A1* | 3/2014 | Williamson | B25J 9/1643 700/261 |
| 2014/0107843 | A1* | 4/2014 | Okazaki | B66C 23/005 700/260 |
| 2016/0184992 | A1* | 6/2016 | Naderer | B25J 9/1687 700/218 |
| 2017/0274530 | A1* | 9/2017 | Mottram | B25J 9/1628 |
| 2018/0021949 | A1 | 1/2018 | Miura | |
| 2020/0061835 | A1* | 2/2020 | Haddadin | B25J 9/1674 |

FOREIGN PATENT DOCUMENTS

| | | |
|---|---|---|
| CN | 110666799 A | 1/2020 |
| GB | 2549072 A | 10/2017 |
| GB | 2560356 A | 9/2018 |
| JP | 2000042957 A | 2/2000 |
| WO | 2020/001742 A1 | 1/2020 |

OTHER PUBLICATIONS

International Search Report and Written Opinion received for PCT Patent Application No. PCT/GB2021/050417, mailed on May 21, 2021, 15 pages.
Konuk, A. R., "Development and Implementation of Compliant Controller on Manus Robot Arm," Oct. 1, 2004, pp. 127.
Search Report for GB Patent Application No. 2002771.0, Issued on Aug. 14, 2020, 1 page.
Siciliano et al., "Indirect Force Control," Robot Force Control, vol. 540, 1999, pp. 31-64.

* cited by examiner

ROBOTIC DEVICE

CROSS-REFERENCE TO PRIOR APPLICATION

This application is a § 371 National Stage Application of PCT International Application No. PCT/GB2021/050417 filed Feb. 19, 2021, which claims the priority of United Kingdom Application No. 2002771.0, filed Feb. 27, 2020, each of which are herein incorporated by reference in their entirety.

TECHNICAL FIELD

The present invention relates to a method of controlling a robotic device, a controller configured to perform the method, and a robotic device comprising the controller.

BACKGROUND

Impedance control is a known method of controlling a robotic device. Impedance control may, for example, be used to control a robotic device comprising a robotic arm having an end effector configured to perform certain tasks such as grasping, lifting and manipulating objects, or such as writing on a board or wiping a surface. In such circumstances, impedance control allows the end effector to be controlled based on a relationship between forces exerted on the end effector and a position of the end effector. With impedance control, the ratio of force output to motion input may be controlled by, in effect, modelling the robotic arm as a mass-spring-damper system. Impedance control may be particularly useful where such tasks are performed in a human environment. In particular, impedance control may be useful where it is desirable for the force produced by a human interacting with the robotic arm to be related to how fast the robotic arm should move, for example. However, impedance control may also be applied for controlling robots in other environments which are not human environments, for example, in cases where it is important to avoid the robotic device damaging objects existing in the environment, such as in a factory setting.

During some interactions with an environment, an unknown load may act on a robotic device. For example, as described above, a robotic arm may be tasked with lifting objects by use of an appropriate end effector. In some cases, the mass of an object being lifted may be unknown, and thus the load acting on the end effector may be unknown. In typical impedance control schemes, such an unknown load may result in an error in the desired position of the end effector, with the unknown load acting to alter an equilibrium position of the end effector which is acting as a mass-spring-damper system. This may also be referred to herein as the load causing the end effector to depart from its "reference trajectory". This can be undesirable, particularly where close control of the position of the end effector is needed, for example, to perform a particular task.

SUMMARY

According to a first aspect of the present invention there is provided a method of controlling a robotic device comprising a body, an end effector coupled to the body by one or more joints and a propulsion system to drive the one or more joints to control a state of the robotic device, the method comprising: applying impedance control to the robotic device; determining a reference trajectory of the end effector; detecting an applied external force and/or torque on the robotic device causing a departure from the reference trajectory; calculating an adjustment to be applied to one or more of the one or more joints to compensate for the detected applied external force and/or torque; and using the calculated adjustment to control the one or more joints to actuate the end effector and recover the reference trajectory of the end effector.

Example methods according to the invention may for the effect of an applied external force and/or torque while continuing to control the end effector by use of an impedance control scheme. The external force and/or torque may, for example, be compensated for without the impedance control behaviour of the robotic device being affected. For example, the perceived stiffness of the movement of the robotic device may remain unchanged while a static error in the position of the end effector with respect to a reference trajectory caused by the external force and/or torque is "corrected". Further advantages of the invention will become apparent from the remainder of this disclosure.

The method may further comprise estimating a joint force and/or torque applied to the one more joints caused by the applied external force and/or torque. Accordingly, an effect of the external force and/or torque on the robotic device, with respect to the one or more joints, may be estimated such that an appropriate adjustment to compensate for this effect can be calculated.

The adjustment may be a joint force and/or torque to be applied to the one or more joints. For example, a joint torque may be applied to provide the adjustment. The adjustment may, in some examples, act as a "pre-load" torque and/or force to be applied to the joints, allowing the applied external force and/or torque to be compensated for while continuing the control of the end effector by applying impedance control.

The detected applied external force and/or torque may be due to an external force acting on the end effector. The method may, accordingly, in some examples, compensate for the effect of an external force applied at the end effector.

Calculating the adjustment to be applied to the one or more joints to compensate for the applied external force and/or torque may comprise determining one or more components of the applied external force and/or torque acting on the end effector along an axis and determining the adjustment as the joint torque and/or force to be applied to the one or more joints to compensate for the one or more components of the external force and/or torque along the axis. The axis may, for example, be a substantially vertical axis. This may allow the adjustment, in some examples, to compensate for an effect of the external force and/or torque acting along a particular axis while filtering out components of the external force and/or torque which do not act along the particular axis. For example, where the axis is a substantially vertical axis, the weight of a load acting on the end effector may be compensated for while filtering out other effects not due to the weight of the load.

Calculating the adjustment to be applied may comprise determining a projection of the applied external force and/or torque acting on the end effector in a vector sub-space and determining the adjustment as the joint torque and/or force to be applied to the one or more joints to compensate for the projection of the external force in the vector sub-space. This may allow for components of the external force and/or torque in any particular sub-space to be compensated for while not compensating for other components of the external force and/or torque.

The applied external force and/or torque may be due to a weight of a load carried by the end effector. Accordingly, the adjustment may compensate for a departure from the reference trajectory caused by the weight carried by the end effector.

The reference trajectory may define a trajectory for the robotic device to lay the load on a surface and the method may comprise refining the adjustment to maintain the reference trajectory as the load is laid on the surface and the weight of the load acting on the end effector is reduced. This may allow for a load to be smoothly transferred from the end effector to a surface.

Estimating the joint force and/or torque may comprise using data from one or more proprioceptive sensors of the robotic device. Accordingly, in certain examples, no additional sensors capable of determining the external force and/or torque acting on the robotic device are required.

Estimating the joint force and/or torque may comprise using a momentum observer method. Use of a momentum observer method may allow for the applied external joint force and/or torque to be estimated without use of measured joint accelerations, such as may be used in the estimation if a direct estimation method is used.

The method may comprise determining a rate at which the calculated adjustment is to be used to control the one or more joints, and using the calculated adjustment to control the one or more joints to recover the reference trajectory of the end effector may comprise adjusting the impedance control at the determined rate. This may allow for providing a delay which allows for the elastic effect provided for by the impedance control law to be more effectively retained while the external force and/or torque is compensated for.

Determining the rate at which the calculated adjustment is to be used to control the one or more joints may comprise applying a low pass filter to a signal related to the detected applied external force and/or torque. A low pass filter may provide convenient means for processing the signal to provide the above-mentioned delay and also may provide for noise in the detected applied external force and/or torque to be filtered out such that the noise is not compensated by the adjustment.

The method may further comprise determining a gravity compensation torque for being applied to the one or more joints to compensate for a torque acting on the robotic device due to a weight of the robotic device; and adjusting the impedance control, using the determined gravity compensation torque, to control the one or more joints to compensate for the torque acting on the robotic device due to the weight of the robotic device. Examples methods herein may, accordingly, compensate for the effect of the weight of the robotic device in addition to the external force and/or torque.

According to a second aspect of the present invention there is provided a controller for controlling a robotic device comprising a body, an end effector coupled to the body by one or more joints and a propulsion system to drive the one or more joints to control a state of the robotic device, the controller being configured to perform a method according to the first aspect of the present invention.

According to a third aspect of the present invention there is provided a set of machine-readable instructions which when executed by a controller of a robotic device cause a method according to the first aspect of the present invention to be performed.

According to a fourth aspect of the present invention there is provided a machine-readable medium comprising a set of machine-readable instructions according to the third aspect of the present invention.

According to a fifth aspect of the present invention there is provided a robotic device comprising: a body; an end effector coupled to the body by one or more joints; a propulsion system to drive the one or more joints to control a state of the robotic device; and a controller configured to: apply impedance control to the robotic device; determine a reference trajectory of the end effector; detect an applied external force and/or torque on robotic device causing a departure from the reference trajectory; calculate an adjustment to be applied to one or more of the one or more joints to compensate for the detected applied external force and/or torque; and using the calculated adjustment, to control the one or more joints to actuate the end effector and recover the reference trajectory of the end effector.

Further features and advantages of the invention will become apparent from the following description of preferred embodiments of the invention, given by way of example only, which is made with reference to the accompanying drawings.

DETAILED DESCRIPTION

Examples of the invention relate to control of a robotic device configured to use impedance control. Such a robotic device may be configured to interact with humans in a human environment. However, examples of the invention may find application in other areas, such as commercial robots intended to operate in a non-human, e.g. factory, environment. Certain examples of the invention are configured to recover a reference trajectory when an external torque is applied to an end effector due to loading of the end effector with an object, e.g., of unknown weight. However, the same control approach described herein may similarly be used to compensate for other types of forces exerted on a robotic device. In any event, a method of controlling a robotic device will now be described, by way of example.

Figure 1:
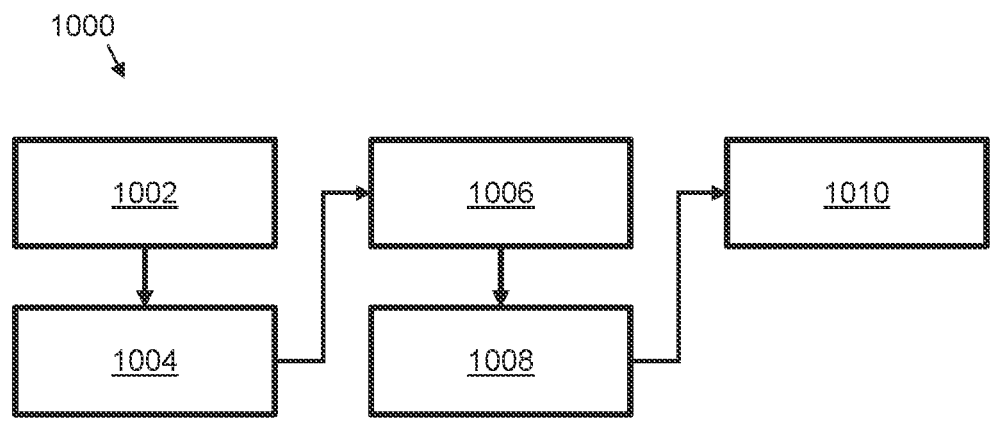
FIG. 1 is a flowchart representation of an example method of controlling a robotic device.

FIG. 1 shows a flowchart representation of an example method 1000 of controlling a robotic device comprising a body, which may also be referred to as a base link, an end effector coupled to the body by one or more joints and a propulsion system to drive the one or more joints to control a state of the robotic device. Driving the one or more joints to control the state of the robotic device may comprise applying joint torques to the joints to control revolution of the joints. In some examples, the robotic device may also comprise one or more joints which allow linear movement. Joints which allow linear movement may be controlled by the application of joint forces by the propulsion system. The method 1000 comprises, at block 1002, applying impedance control to the robotic device. Applying impedance control typically comprises applying a control law which takes into account a state of the robotic device, e.g. as measured by one or more sensors, and a reference trajectory and determining torques to be applied to the one or more joints by the propulsion system. An example impedance control law is described below in more detail.

At block 1004, the method comprises determining a reference trajectory of the end effector. The reference trajectory may define a path for the end effector to follow in three-dimensional space in the environment in which the robotic device 100 is located. The reference trajectory may, for example, define a velocity, a position and/or orientation and an acceleration for the end effector. In some examples, the reference trajectory may be a trajectory for the end effector to follow to allow the end effector to perform a task, for example carrying an object or performing a writing task or wiping a surface. In other examples, the reference trajectory may comprise a stationary trajectory intended to keep the end effector in a fixed position.

At block 1006, the method 1000 comprises detecting an applied external force and/or torque acting on the robotic device and causing a departure from the reference trajectory. The applied external force and/or torque is an external force and/or torque acting on the robotic device which may, for example, be due to an external force acting on the end effector. For example, the applied external force and/or torque may be a force acting on the end effector due to a weight of a load carried by the end effector. The external force and/or torque may alternatively or additionally be due to a torque being applied to the end effector such as by a twisting effect by the hand of a user. The external force and/or torque may in some examples be a force/torque applied to the robotic device at a point other than the end effector. The applied external force and/or torque may result in a departure of the end effector from the reference trajectory.

In some examples, a joint force and/or torque applied to the one or more joints caused by the applied external force and/or torque may be estimated. This may be referred to herein as the applied joint force and/or torque or the external joint force and/or torque. The joint force and/or torque may be estimated from data indicating the state of the robotic device, e.g. as measured by one or more sensors. The state of the robotic device may be defined in terms of respective positions, velocities and accelerations of the one or more joints. The data may come from one or more proprioceptive sensors. The proprioceptive sensors may, for example, detect joint angles and/or torques of the one or more joints. In examples where one or more of the joints allow linear movement, one or more proprioceptive sensors may detect joint positions and/or forces of the joints which allow linear movement. This may be referred to herein as using a "sensorless" estimation method to estimate the applied joint force and/or torque since no sensors other than the proprioceptive sensors are used in the estimation process. Use of a sensorless method may remove the need for additional sensors capable of determining the load acting on the end effector which may have benefits such as reducing the cost of producing the robotic device. One example of a sensorless estimation method which may be used in examples described herein is a "momentum observer" method, for example, as described in "*Sensorless robot collision detection and hybrid force/motion control*", A. De Luca and R. Mattone, Proceedings of the 2005 IEEE international conference on robotics and automation, 2005, which is incorporated herein by reference. In other examples, other sensorless methods of estimating the applied joint force and/or torque may be used. For example, the applied joint force and/or torque may be estimated directly, e.g. using a method as described in "*An acceleration-based state observer for robot manipulators with elastic joints*" by A. De Luca, D. Schroder and M. Thummel, Proceedings 2007 IEEE international conference on robotics and automation, 2007. In another example, a "joint velocity observer" method may be used, e.g. as described in S. Haddadin, Towards Safe Robots; Approaching Asimov's 1st Law, Springer Tracts in Advanced Robotics, 2014. In yet another example an "energy observer" method may be used, e.g. as described by A. De Luca, A. AlbuSchaffer, S. Haddadin and G. Hirzinger in "*Collision detection and safe reaction with the DLR-III lightweight manipulator arm,*" 2006 IEEE/RSJ International Conference on Intelligent Robots and Systems, 2006. All of the preceding documents are incorporated herein by reference.

At block 1008 an adjustment is calculated to be applied to one or more of the one or more joints to compensate for the detected applied external force and/or torque. In some examples, calculating the adjustment to be applied comprises determining a component of an external force and/or torque acting on the end effector in a particular vector sub-space. For example, the applied external force and/or torque may be an external force, and a projection of the external force along a particular axis may be determined. The adjustment may, accordingly, for example, be calculated to compensate for the external force acting along the axis. For example, the method may be used to compensate for a force acting on the end effector due to the weight of an external load acting on the end effector. In such examples, the axis may be a substantially vertical axis. Determining the adjustment may then comprise determining an adjustment to compensate for the action of the weight of the external load on the end effector. This may be done by projecting the detected applied external force and/or torque along the vertical axis. Accordingly, the weight of the external load may be compensated for while contributions to the applied external force and/or torque which are not due to the weight of the external load are filtered out and are not compensated for. An example of this will be described below in more detail.

In some examples, methods may further comprise determining a rate at which the calculated adjustment is to be used to control the one or more joints. The adjustment may be applied to recover the reference trajectory of the end effector at the determined rate. This may provide a delay which allows for the elastic effect provided for by the impedance control law to be retained. For example, since the estimation of the applied joint force and/or torque may be obtained in a small amount of time, the applied external force and/or torque could be compensated for by directly adding the estimated joint forces/or torques to the impedance control forces and/or torques to be applied to control the joints. However, in certain examples, such an approach could make negligible the "spring" effect provided by the impedance control. Introducing a delay by adjusting the impedance control at a determined rate may prevent this. Determining the rate at which to apply the adjustment may comprise applying a low pass filter to a signal related to the detected applied external force and/or torque. For example, a low pass filter may be applied to a signal representing the detected applied external force and/or torque. The low pass filter may be tuned as necessary to provide the desired delay. Use of a low pass filter may, further, provide for noise in the detected applied external force and/or torque to be filtered out such that the noise is not compensated by the adjustment, which may be undesirable.

Finally, at block 1010, the method 1000 comprises using the calculated adjustment to control the one or more joints to actuate the end effector to recover the reference trajectory of the end effector. Using the adjustment at block 1010 may in some examples comprise adding a calculated preload torque to joint torques determined by the impedance control law for controlling the end effector. In one example, the adjustment may thus comprise a torque to be applied to the joints in addition to joint torques determined according to the impedance control law. Where one or more of the joints is a linear joint, the adjustment may additionally comprise a joint force to be applied to the linear joints. By the application of the adjustment, a preload force and/or torque may be applied which allows the reference trajectory to be recovered to compensate for the applied external force and/or torque while continuing the control of the end effector by applying impedance control. Accordingly, the method may be considered a method of compensating in force space for an error in the position and/or orientation of the end effector, rather than compensating in Cartesian space. This is since the adjustment is applied to recover the reference trajectory, rather than, e.g., the method attempting to directly correct the position of the end effector with reference to a desired position.

The adjustment of the impedance control may be dynamic such that changes to the applied external force and/or torque can be compensated for. For example, the robotic device may be configured to grasp and lift an object and later to lay the object down. When the object is grasped, the weight of the object begins to act on the end effector. At this point, an adjustment to compensate for the detected applied external force and/or torque due to the object is calculated and the impedance control adjusted, using the calculated adjustment, to recover the reference trajectory. When the process of laying the object down on a surface begins, contact between the object and the surface is detected. As the object is laid down, the load on the end effector is reduced until it reaches zero when the object is laid on the surface and no longer weighs on the end effector. Accordingly, in some examples, the adjustment, e.g. preload torque, used to compensate for the weight of the object may be gradually reduced to zero as the object is laid down on the surface. Once the calculated adjustment reaches zero, the grasp of the end effector on the object may be released. This may allow for the object to be smoothly transferred from the end effector to the surface.

Certain example methods also comprise determining a gravity compensation torque to compensate for a torque acting on the robotic device due to a weight of the robotic device. The impedance control may in such methods be adjusted using the gravity compensation torque, in a known manner. In a similar manner to as how the weight of the robotic device may be compensated for by a gravity compensation method, certain example methods may also compensate for other effects such as a Coriolis effect acting on the robotic device.

Accordingly, in certain examples, methods described herein may be considered a means for correcting for a static error in the position of an end effector with respect to a reference trajectory due to an unknown load acting on the end effector. The applied joint force and/or torque acting on the joints of the robotic device due to the unknown load may be estimated, e.g. by sensorless means, and can be compensated by "preloading" the joints controlled by the impedance control law. This means that the external applied load may be compensated for without the impedance control behaviour of the robotic device being impacted. That is, the static positional error caused by the applied external force and/or torque can be corrected without modifying either the desired position or the Cartesian impedance. Instead, the force-displacement curve for the robot is offset by the preload force/torque while the perceived "stiffness" of the movement of the robotic device may remain unchanged. Among other advantages, this may allow the robotic device to use the end effector to continue to perform a task requiring impedance control with positional accuracy when an unknown load is applied to the end effector.

Figure 2A:
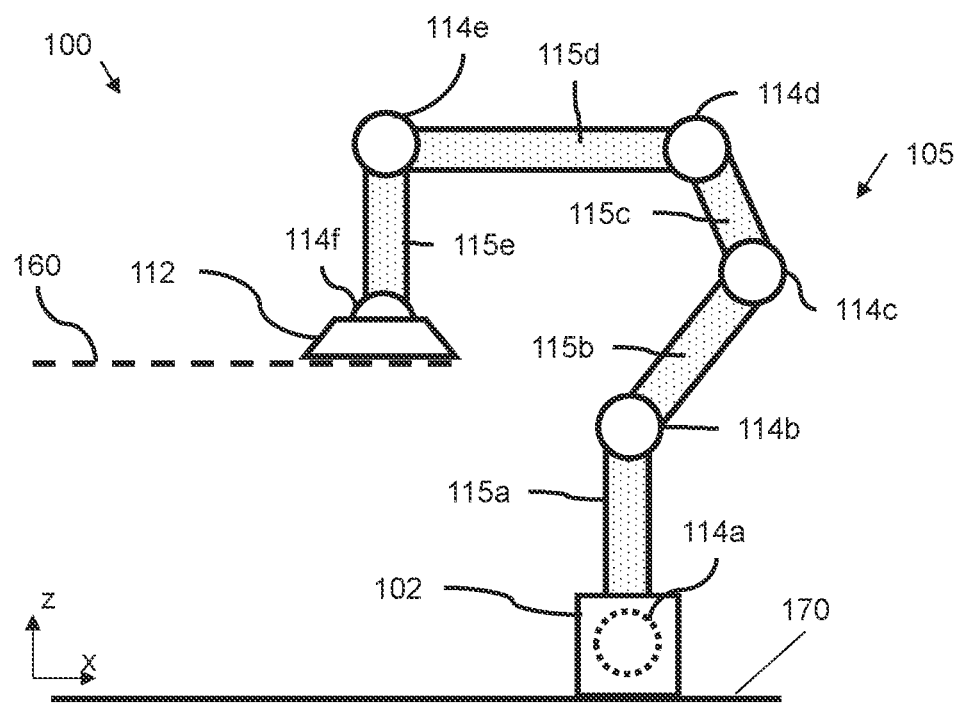
FIGS. 2A to 2C are schematic diagrams showing an example robotic device applying a control method according to examples described herein.

FIG. 2A shows a simplified representation of an example robotic device 100 configured to perform the example control method described above. FIG. 2A shows a side view of the example robotic device 100. The example robotic device 100 comprises an actuated robotic arm 105 comprising a body 102, which, as mentioned above, may also be referred to as a base link, an end effector 112 and a number of joints. The robotic device 100 also comprises a propulsion system (not shown) for actuating the one or more joints. In some examples, the joints are powered joints and the propulsion system comprises a set of joint motors, where a joint motor of the set of joint motors controls one of the joints. The positions of the one or more joints are controlled to control a position and/or the orientation of the end effector 112 within Cartesian space such that the end effector 112 can be moved in the environment in which of the robotic device 100 is located. For example, where the position and orientation of the end effector 112 is controlled by the joints, the position and orientation of the end effector 112, which may in some examples be referred to as the "pose" of the end effector 112, may be controlled in a 6-dimensional space.

In the example robotic device 100, the actuated robotic arm 105 comprises 6 joints 114a-114f which are configured to allow positioning of the end effector 112 with, for example, six degrees of freedom. The robotic device 100 may be referred to as a 6R robot. In another example, the robotic device 100 may have another number of degrees of freedom, for example seven degrees of freedom. The joints 114a-114f of the actuated robotic arm 105 are coupled by mechanical linkages or "links". FIG. 2A shows a first link 115a that mechanically couples a first joint 114a to a second joint 115b. A second link 115b mechanically couples a second joint 114b to a third joint 114c. The robotic arm 105 further comprises a third link 115c, a fourth link 115d, and a fifth link 115e which respectively mechanically couple the third joint 114c to a fourth joint 114d, the fourth joint 114d to a fifth joint 114e, and the fifth joint 114e to a sixth joint 114f. The robotic device 100 may comprise further joints and/or links not shown in the figures. For example, as mentioned above, in some examples, the robotic device may comprise one or more joints which allow translational, i.e. linear, movement in additional to joints which allow rotational movement. Each link may comprise a rigid elongate member. Each link may be a single unit or multiple coupled sub-units. Each link may have solid and/or hollow portions. In one case, a link may comprise a hollow tube and/or a frame of rigid material such as steel, aluminium or carbon fibre. In some examples, a tool (not shown in the figures) may be mechanically coupled to the end effector 112.

The robotic device 100 is positioned on a surface 170 defining an x-y plane. The x-y plane may be a horizontal plane such that the z-axis is a vertical axis. Though, this need not be the case in all examples. The position and/or orientation of the end effector 112 with respect to this three-dimensional co-ordinate system may be controlled by controlling the rotation of one or more of joints 114a-114f. Each of the joints 114a-114f is configured to rotate about at least one axis to allow movement of the end effector 112 within a particular degree of freedom. For example, one or more of the joints 114a-114f, in a given configuration of the robotic device 100, may rotate about an axis that is parallel to the z-axis, to allow a position of the end effector 112 within the x-y plane to be controlled. Further, one or more of the joints 114a-114f may be configured to rotate to control a position of the end effector 112 along the z-axis. In some examples, one or more of the joints 114a-114f may comprise either a ball joint or a two assembly that allows respective rotation around axes parallel to both the z and y axes.

The joints 114a-114f of the actuated robotic arm 105 may be rotated by applying respective joint torques to the joints 114a-114f. The joint torques are computed by a controller (not shown in FIGS. 2A-C) performing a control method, as is described herein. The computed joint torques are applied to the joints by the propulsion system, which may comprise one or more electronic motors. For example, the propulsion system may comprise a plurality of electronic motors and one of the electronic motors may be located at each of the joints 114a-114f. The robotic device 100 also comprises one or more sensors (not shown) for detecting a state of the robotic device 100 and feeding this to the controller for use in the control method. The sensors may, for example, detect respective joint angles of the joints 114a-114f and/or measure torques being applied to the joints 114a-114f.

The controller is configured to apply the control method to control the position and orientation of the end effector 112 along a reference trajectory 160. The reference trajectory 160 may comprise a set of positions and velocities to be effected at the end effector 112. The reference trajectory may define a path for movement of the end effector 112, for example, to perform a task such as carrying an object. The reference trajectory may in other examples be a stationary trajectory defining a fixed intended position for the end effector 112. FIG. 2A shows an example reference trajectory 160 comprising a line in space along which the end effector 112 is controlled to move. The reference trajectory 160 is represented by a dotted line in FIGS. 2A-2C.

Figure 2B:
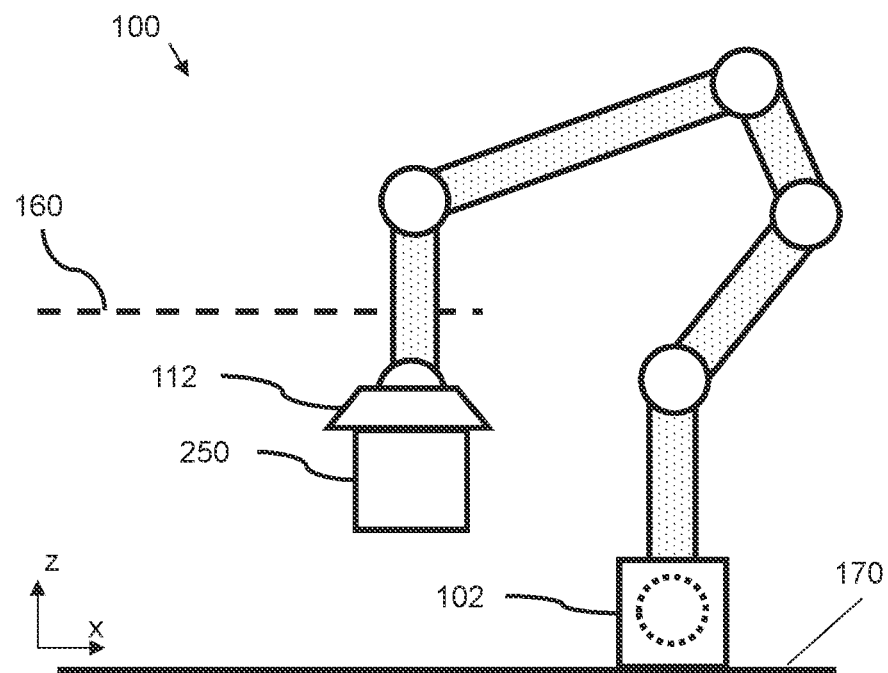

Turning to FIG. 2B, the robotic device 100 of FIG. 2A is shown holding at the end effector 112 an object 250. The object 250 may, for example, be a load to be held by the end effector 112, and the reference trajectory 160 may define a path along which the end effector 112 is desired to move to carry the object 250. FIG. 2B shows the example robotic device 100 immediately following the end effector 112 being loaded with the object 250. In FIG. 2B, the robotic device 100 is in a state wherein the end effector 112 has departed downwardly from the reference trajectory 160 due to the object 250 weighing on the end effector 112. The external applied force due to the object 250 which results in the departure from the reference trajectory 160 can be detected by the sensors of the robotic device 100. Input from the sensors may be used to estimate the applied external joint torque acting on one or more of the joints 114a-114f of the robotic arm 105 due to the object 250.

Figure 2C:
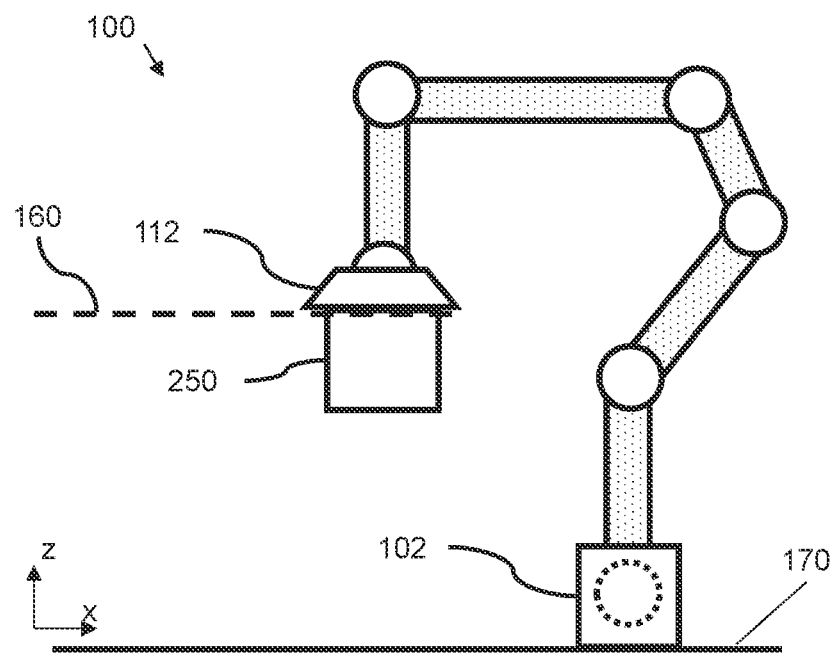

From the position shown in FIG. 2B, the controller continues to perform the control method to apply the adjustment to compensate for the effect of the load 250. FIG. 2C shows the example robotic device 100 once the adjustment has been applied and the reference trajectory 160 recovered. That is, the position of the end effector 112 can be seen to have been returned the reference trajectory 160 while holding the load 250. From this position, the robotic device 100 may continue to actuate the end effector 112 to move along the reference trajectory 160 while applying an impedance control law. For example, the control method applied may be such that the stiffness of the robotic device as defined by the parameters of the impedance control law is unchanged due to the presence of the load 250. This may mean that in the configuration shown in FIG. 2C, any additional external interaction with the robotic arm 105, such as a random collision, e.g. with a person, may perceive the same stiffness that the robot arm 105 had when unloaded (i.e. as shown in FIG. 2A).

The time taken for the robotic device 100 to recover the reference trajectory 160 for the end effector 112, i.e. to go from the configuration shown in FIG. 2B to the configuration shown in FIG. 2C, may be determined by the parameters of a low pass filter applied in the signal path by the controller, as is described above and as will be described below in more detail.

Figure 3:
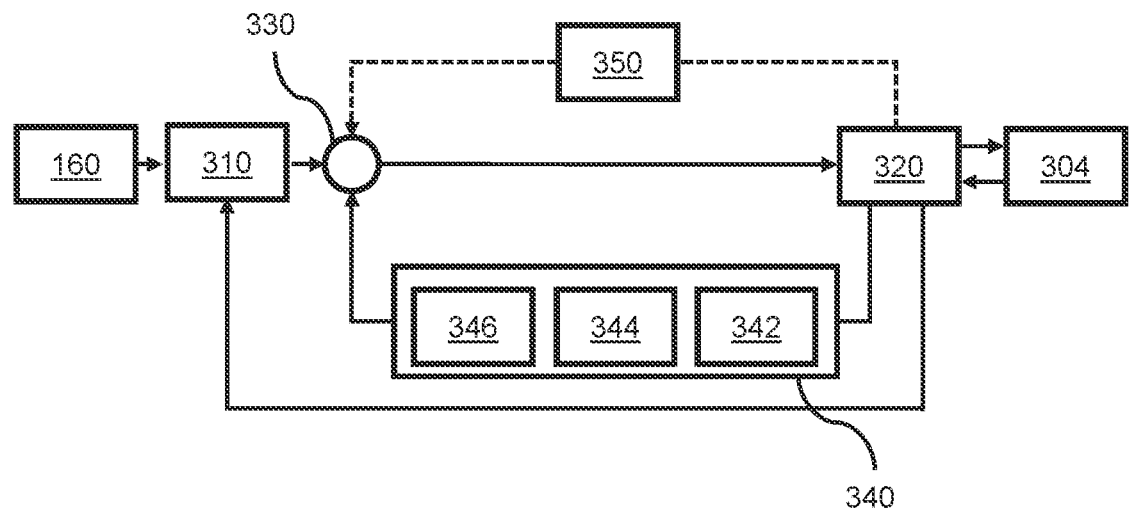
FIG. 3 is a schematic diagram of an example control method described herein.

FIG. 3 shows a schematic flowchart diagram representing an example control scheme 300 for the robotic device 100. The control scheme 300 comprises applying impedance control to control movement of the robotic device 100 to interact with the environment 304. An impedance control block 310 of the control scheme 300 represents the implementation of the impedance control method to determine control signals for controlling joint torques to be provided to the joints based on the state of the robotic device 100 and the reference trajectory 160. A state block 320 represents a state of the robotic device 100 in the control scheme 300. The impedance control block 310 receives as inputs the state of the robotic device 100 from the state block 320 and the reference trajectory 160. The impedance control block 310 applies an impedance control law, in a known manner. For example, the impedance control block 310 may compute an impedance control law in the form $$\tau_{imp} = J(q)^T (K(x_{des} - x_{robot}(q)) + D(\dot{x}_{des} - \dot{x}_{robot}(q,\dot{q}))) \quad (1)$$

where $x_d$ and $\dot{x}_{des}$ are, respectively, a position and a velocity defined by the reference trajectory 160 and $x_{robot}(q)$ and $\dot{x}_{robot}(q, \dot{q})$ are, respectively, a position and velocity of the end effector 112 computed from the state q of the robotic device 100.

The control scheme 300 further comprises an adjustment block 330 which is configured to apply the adjustment to compensate for an effect of an applied external force and/or torque on the robotic device 100, as will now be described.

The control scheme 300 comprises an external force and/or torque compensation block 340. The external force and/or torque compensation block 340 is configured to determine an applied external force and/or torque acting on the robotic device and causing a departure from the reference trajectory. The external force and/or torque compensation block 340 comprises an external joint torque estimation block 342 which takes as an input from the state block 320 the state of the robotic device 100. The external joint torque estimation block 342 estimates the joint torque acting on the one or more joints of the robotic device 100 due to the external force and/or torque. In examples, the external joint torque estimation block 342 estimates the applied external joint torque from the state of the robot received from block 320. As discussed above, this may be described as using a sensorless method, i.e. a method which relies only on the proprioceptive sensors of the robotic device 100 and which does not, for example, use data obtained from exteroceptive load sensors or other sensors. One example of a sensorless method which may be used at the external force and/or torque estimation block 340 to estimate the applied external joint torque is a momentum observer method. Using a momentum observer method may be advantageous in some examples since it may allow for the applied external joint torque to be estimated without use of measured joint accelerations which may be required by a direct estimation method. This may be desirable since obtaining joint accelerations may require computing a second derivative of joint encoder measurements which may be subject to noise.

Further, the momentum observer method does not require inversions of the mass matrix to be computed, making it potentially more computationally efficient than a velocity observer method which typically requires mass matrix inversions to be computed at each of a plurality of iterations involved in obtaining convergence to the applied external joint torque.

The external applied joint torque estimated at the external joint torque estimation block 342 is provided to the adjustment block 330 to apply an adjustment, e.g. a preload torque, to compensate for the estimated applied external joint torque. However, in certain examples, further steps are performed before the estimated applied external joint torque is provided to the adjustment block 330 be used to adjust the impedance control method. For example, in the example shown in FIG. 3, the external force and/or torque compensation block 340 further comprises a projection block 344. At the projection block 344, the estimated external joint torque may be used to compute the applied external force and/or torque acting on the end effector, which may be referred to as the action on the end effector 112. A projection of the applied external force and/or torque acting on the end effector, or action, into a particular sub-space is then determined. The sub-space into which the action is projected may, for example, be define particular axis. This, for example, allows for compensating for a load acting on the end effector 112 along a particular axis while excluding other external effects on the end effector 112. In an example, the projection block 344 is configured to project the estimated applied external force and/or torque into a Cartesian space and from this to estimate the 6-dimensional action on the end effector 112. The 6-dimensional action comprises 3 Cartesian components of force and 3 moments. Once projected into the Cartesian space, the estimated action at the end effector may be projected along a pre-determined axis. For example, the projection block 344 may be configured to determine a projection of the load acting on the end effector 112 along a vertical axis. This may allow for the external force and/or torque compensation block 340 to compensate for the weight of an external load acting on the end effector 112 while excluding forces along other directions. Thus, it may be that the action on the end effector 112 due to the weight of the load may be taken into account while other external effects are filtered out.

In FIG. 3, the external force and/or torque compensation block 340 comprises a filter block 346. The filter block 346 is configured to control a rate at which the control scheme 300 compensates for the applied external force and/or torque by introducing a delay. The filter block 346 in examples comprises processing the signal indicative of the detected applied external force and/or torque to be compensated for with a low pass filter. The low pass filter may be tuned to provide the desired responsiveness in adjusting for the applied external forces/torques. The low pass filter may also act to filter out noise in the detected applied external force/torque signal, such that the preload compensation action is smoothed.

The filter block 346 is shown in FIG. 3 to follow the projection block 334 in the signal path of the external force and/or torque compensation block 340. However, in other examples, the filter block 346 may be placed in a different position in the signal path. For example, the filter block 346 may be positioned prior to the projection block 344 in the signal path such that the projection block 344 projects the already filtered applied external force and/or torque.

The external force and/or torque compensation block 340 calculates the adjustment to be made to compensate for the detected applied external force and/or torque, which may be filtered and/or projected along a given axis as described above, and provides it to the adjustment block 330. The adjustment block 330 then applies the adjustment to the impedance control method. The adjustment block 330 may, for example, add the adjustment in the form of a preload torque to the joint torques output by the impedance control block 310 for controlling the one or more joints of the robotic device 100. Accordingly, the method 300 in certain examples may be considered a method of adding a "preload" torque to the impedance control method. As mentioned above, this means that the external applied load may be compensated for, without the "stiffness" of the mass-spring-damper being changed. Accordingly, example methods described herein may allow for retaining the benefits of applying impedance control in controlling the forces exerted on and by and the position of the end effector 112 while compensating for a positional error introduced by an unknown load acting on the end effector. Thus, the reference trajectory of the end effector 112 may be recovered, for example, allowing the end effector 112 to perform a task which is encoded by the reference trajectory while recovering positional accuracy.

In some examples, the control scheme 300 may further comprise a gravity compensation block 350. The gravity compensation block 350 is configured to compute a gravity compensation torque to compensate for the weight of the robotic device 100. In examples, the gravity compensation block 350 acts to provide a feedforward term to the adjustment block 330. The gravity compensation torque may be computed based on the state of the robotic device 100 as provided by the state block 320. The gravity compensation torque may then be used at the adjustment block 330 to adjust the impedance control and provide that the impedance control is not affected by an error due to the weight of the robotic device 100. As mentioned above, additional effects such as a Coriolis effect may, in some examples, be compensated for in a similar method to how the gravity compensation block 350 operates.

The principles employed by the external force and/or torque compensation block 340 in the example method 300 will now be described in more detail. The external joint torques estimated by the sensorless applied joint torque estimation process at block 342 may be labelled $\hat{\tau}_{ext}$. The vector $\hat{F}_{ext}$ representing the external force and/or torque applied at the end effector 112 of the robotic device 100 can be computed from $\hat{\tau}_{ext}$ according to $$\hat{F}_{ext} = J^{T+} \hat{\tau}_{ext} \quad (2)$$

where $J^{T+}$ represents the Moore-Penrose pseudo-inverse of the transpose of the Jacobian matrix of the robotic device 100.

As mentioned above, the force and/or torque vector at the end effector 112 may in some examples be projected into a sub-space, such as a vertical axis. In the example where the projection is along the vertical axis, the projection along the vertical axis of the determined applied external force and/or torque $\hat{F}_{ext}$ may be represented as $\hat{F}_v$ and related to $\hat{F}_{ext}$ by the following expression, where $P_v$ is the projector along the vertical axis.

$$\hat{F}_v = P_v \hat{F}_{ext} \quad (3)$$

In certain examples, the vertical axis is aligned with the z-axis. In such examples, projection along the vertical axis coincides with projection along the z-axis and the following expression is true.

$$P_v = P_z = \begin{bmatrix} 0 & 0 & 0 \\ 0 & 0 & 0 \\ 0 & 0 & 1 \end{bmatrix} \quad (4)$$

In other examples, projection along the vertical axis may not coincide with projection along the z-axis. For example, the robotic device 100 may be inclined with respect to the surface 170 and thus the frame of the robotic device 100 may not be aligned with the Cartesian frame defined by the surface 170. In such examples, a more general projector may be used, as follows. Where A is the basis for a linear space, the projection p of a point b on the linear space can computed as $$p = A(A^T A)^{-1} A^T b = P_A b \quad (5)$$

where the projector $P_A$ on the linear space A is defined as follows.

$$P_A = A(A^T A)^{-1} A^T \quad (6)$$

It may be noted that the error e describes the component of b orthogonal to the linear space A, where $$e = b - P_A b = (I - P_A) b \quad (7)$$

and where $(I-P_A)$ is the projector in the nullspace of $A^T$, which is orthogonal to the column space of A.

The filter applied at the filter block 346 may also be described, using similar notation to the above, as $$\hat{F}_z^{lp} = L_{filt} \hat{F}_z \quad (8)$$

In Equation (8), $L_{filt} \hat{F}_z$ represents the low pass filtering operation applied on the vector $\hat{F}_z$. It should, however, be noted that $L_{filt}$ is not technically a linear operator. We keep this symbol in the following description for the sake of clarity.

In this example, $\hat{F}_z^{lp}$ is the actual vector representing the effective contact force at the end effector 112 which is to be compensated. In order to determine a preload torque to be applied to the joints to provide the preload compensation, $\hat{F}_z^{lp}$ is projected back into the joint torque space of the robotic device 100 by use of the following expression.

$$\tau_{preload} = J^T \hat{F}_z^{lp} \quad (9)$$

The process for obtaining the preload torques can thus be summarised with the following expression, obtainable from the above equations.

$$\tau_{preload} = J^T L_{filt} P_v J^{T+} \hat{\tau}_{ext} \quad (10)$$

Figure 4:
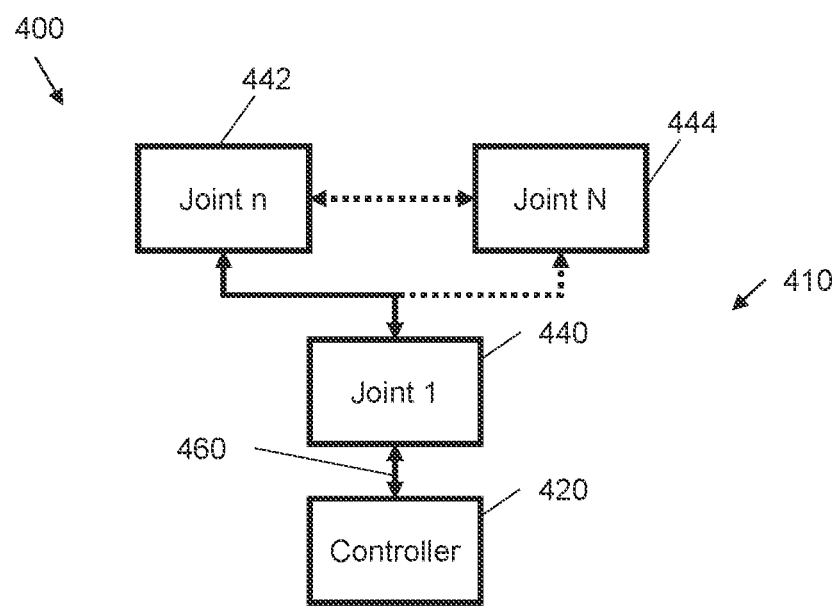
FIG. 4 is a schematic diagram showing example control components for an example robotic device.

FIG. 4 shows an example control system 400 for the robotic device 100 for implementing example methods described herein. The example control system 400 comprises internal body components 410 that may be supplied as part the body of the robotic device (e.g. may be mounted on or in the body, for example, in a base link and/or in other links of the device). The internal body components 410 comprise a controller 420 and a set of joint control systems 440 to 444. In FIG. 4, the set of joint control systems 440 to 444 comprise a first joint control system 440, which may, e.g., control the first joint 114a mounted upon the base link of the robotic device, and a set of nth joint control systems 442 to 444, which may control a plurality of joints that are external to the body of the robotic device, such as the previously described second to sixth joints 114b-114f of the robotic device 100. The set of joint control systems 440 to 444 may be coupled in a number of ways as known in the art, including a serial daisy-chain style arrangement or a parallel coupling. This is indicated by the dashed arrows in FIG. 4. The drive control systems 440 to 444 may control a torque that is applied by one or more electric motors arranged at the joints in response to signals received from the controller 420.

The controller 420 may comprise one or more processors, including one or more microprocessors, central processing units and/or graphical processing units, and a memory (or memories). The controller 420 is communicatively coupled to the example control components to control an action of the robotic device. In FIG. 4, this coupling is achieved via a systems bus 460. Different levels of control may be provided, e.g. in one case the controller 420 may provide desired joint torques that are converted by the set of joint control systems 440 to 444 into joint actuator commands or in another case the controller 420 may provide the joint actuator commands themselves, which are then effected by the set of joint control systems 440 to 444.

As mentioned above, although certain examples above describe the applied external force and/or torque being projected along a vertical axis, in order to account for a weight of an external load. In other examples, projection may be in another vector sub-space, for example along any other axis. For example, methods described herein may be used to compensate for external forces along different directions or torques about different axes, where these external forces/torques are not related to gravity. For example, the applied external torque may be due to a biasing force acting on the end effector in a particular direction. The predetermined axis of projection could in such a case be aligned with the direction along which the biasing force acts.

Although certain examples above describe compensating for an action on the end effector of the robotic device, methods described herein may be used to compensate for an action at another point on the device, for example a contact point between the device and an external object.

Certain examples described herein are described as comprising an actuated robotic arm. In these examples, the term "actuated" is used to indicate that one or more joints of the robotic arm may be moved by way of a propulsion system. The propulsion system may, for example, comprise one or more actuators, such as joint motors or electro-active polymers. Hence, the actuated robotic arm is configured to move within its environment. Although the term "arm" may be used in some examples, the robotic arm may be any form of jointed limb or mechanical assembly that is capable of moving an end effector within space. It should be noted that an actuated robotic arm may differ from that shown in FIGS. 2A-C yet still provide for multiple degrees of freedom for the end effector within an environment. For example, electro-active polymers may be arranged around a pivoted joint and controlled by an electrical current. Different types of sensors may be used to provide measurements of the state of the robotic device depending on the type of actuation of the joints. For example, measurements of electrical current supplied for actuating the joints may provide an indication of the state of the device. In certain cases, a camera arrangement may be disposed on the robotic device to enable visual feedback of the position of the end effector within three-dimensional space.

It should be noted that the example robotic device 100 is but one of many potential configurations of a robotic device having an actuated robotic arm. At least different joint arrangements, and different body arrangements are envisaged.

The above examples are to be understood as illustrative. Further examples are envisaged. Any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A method of controlling a robotic device comprising a body, an end effector coupled to the body by one or more joints and a propulsion system to drive the one or more joints to control a state of the robotic device, the method comprising:
    applying impedance control to the robotic device;
    determining a reference trajectory of the end effector;
    detecting an applied external force and/or torque on the robotic device causing a departure from the reference trajectory, wherein the applied external force or torque is at least partially due to a weight of a load carried by the end effector;
    calculating an adjustment to be applied to one or more of the one or more joints to compensate for the detected applied external force and/or torque;
    applying a low pass filter to a signal related to the detected applied external force and/or torque, the low pass filter providing a control delay to improve performance of the impedance control; and
    using the calculated adjustment to control the one or more joints to actuate the end effector and recover the reference trajectory of the end effector, wherein the adjustment is a joint force and torque to be applied to the one or more joints, the adjustment is dynamically adjusted in real time based on the estimated joint force and/or torque and the control delay provided by the low pass filter,
    wherein the reference trajectory defines a trajectory for the robotic device to lay the load on a surface, the method comprises refining the adjustment to maintain the reference trajectory as the load is laid on the surface and the weight of the load acting on the end effector is reduced, the adjustment is reduced to zero as the load is laid down on the surface such that the end effector releases the load when the detected applied external force or torque, due to the weight of the load, is zero.

2. The method according to claim 1 further comprising estimating a joint force and/or torque applied to the one or more joints caused by the applied external force and/or torque.

3. The method according to claim 1, wherein the detected applied external force and/or torque is due to an external force acting on the end effector.

4. The method according to claim 3, wherein calculating the adjustment to be applied to the one or more joints to compensate for the applied external force and/or torque comprises determining one or more components of the applied external force and/or torque acting on the end effector along an axis and determining the adjustment as the joint torque and/or force to be applied to the one or more joints to compensate for the one or more components of the external force and/or torque along the axis.

5. The method according to claim 4, wherein the axis is a substantially vertical axis.

6. The method according to claim 2, wherein estimating the joint force and/or torque comprises using data from one or more proprioceptive sensors of the robotic device.

7. The method according to claim 6, wherein estimating the joint force and/or torque comprises using a momentum observer method.

8. The method according to claim 1, comprising determining a rate at which the calculated adjustment is to be used to control the one or more joints, and using the calculated adjustment to control the one or more joints to recover the reference trajectory of the end effector comprises adjusting the impedance control at the determined rate.

9. The method according to claim 1, further comprising: determining a gravity compensation torque for being applied to the one or more joints to compensate for a torque acting on the robotic device due to a weight of the robotic device; and adjusting the impedance control, using the determined gravity compensation torque, to control the one or more joints to compensate for the torque acting on the robotic device due to the weight of the robotic device.

10. A controller for controlling a robotic device comprising a body, an end effector coupled to the body by one or more joints and a propulsion system to drive the one or more joints to control a state of the robotic device, the controller being configured to perform the method according to claim 1.

11. A set of non-transitory machine-readable instructions which when executed by a controller of a robotic device cause the method according to claim 1 to be performed.

12. A non-transitory machine-readable medium comprising the set of machine-readable instructions according to claim 11.

13. The method of claim 1, wherein the step of calculating the adjustment comprises accounting for the applied external force or torque that is due to the weight of the load and ignoring an applied external force or torque that is not due to the weight of the load.

14. The method of claim 13, wherein the calculated adjustment is defined by an axis in a Cartesian space such that the adjustment compensates for the applied external force or torque along the axis due excluding other forces not defined along the axis.

15. The method of claim 2, wherein the applied external force and/or torque on the robotic device causing the departure from the reference trajectory is calculated using the following equation: $F_{ext} = J^{T+} T_{ext}$
    wherein $F_{ext}$ represents the applied external force and/or torque on the robotic device;
    wherein $J^{T+}$ represents the Moore-Penrose pseudo-inverse of the transpose of the Jacobian matrix of the robotic device; and
    wherein $T_{ext}$ represents the estimated joint force and/or torque applied to the one or more joints caused by the applied external force and/or torque.

16. A robotic device, comprising:
    a body;
    an end effector coupled to the body by one or more joints;
    a propulsion system to drive the one or more joints to control a state of the robotic device; and
    a controller configured to:
    apply impedance control to the robotic device;
    determine a reference trajectory of the end effector;
    detect an applied external force and/or torque on the robotic device causing a departure from the reference trajectory, wherein the applied external force or torque is due to a weight of a load carried by the end effector;
    calculate an adjustment to be applied to one or more of the one or more joints to compensate for the detected applied external force and/or torque;
    apply a low pass filter to a signal related to the detected applied external force and/or torque, the low pass filter providing a control delay to improve performance of the impedance control; and using the calculated adjustment, to control the one or more joints to actuate the end effector and recover the reference trajectory of the end effector, wherein the adjustment is a joint force and torque to be applied to the one or more joints, the adjustment is dynamically adjusted in real time based on the estimated joint force and/or torque and the control delay provided by the low pass filter, wherein the reference trajectory defines a trajectory for the robotic device to lay the load on a surface, the adjustment is refined to maintain the reference trajectory as the load is laid on the surface and the weight of the load acting on the end effector is reduced, the adjustment is reduced to zero as the load is laid down on the surface such that the end effector releases the load when the detected applied external force or torque, due to the weight of the load, is zero.

17. The robotic device of claim 16, wherein the step of calculating the adjustment comprises accounting for the applied external force or torque that is due to the weight of the load and ignoring an applied external force or torque that is not due to the weight of the load.

18. The robotic device of claim 17, wherein the calculated adjustment is defined by an axis in a Cartesian space such that the adjustment compensates for the applied external force or torque along the axis due while excluding other forces not defined along the axis.

19. The robotic device of claim 16, further comprising:
a first joint proximate the body;
a second joint, wherein the first joint and the second joint are mechanically coupled with a first link; and
a third joint proximate the end effector, wherein the second joint and the third joint are mechanically coupled with a second link,
wherein the controller is configured to calculate an adjustment to be applied to each of the first joint, the second joint, and the third joint, to compensate for the detected applied external force and/or torque on each of the joints; and
using the calculated adjustment, to control each of the first joint, the second joint, and the third joint to actuate the end effector and recover the reference trajectory of the end effector, the adjustment is a joint force and torque to be applied to each of the joints.

* * * * *